H. G. PEARSON.
FRUIT SIZING MACHINE.
APPLICATION FILED MAR. 20, 1917.
1,242,034.
Patented Oct. 2, 1917.
4 SHEETS—SHEET 1.
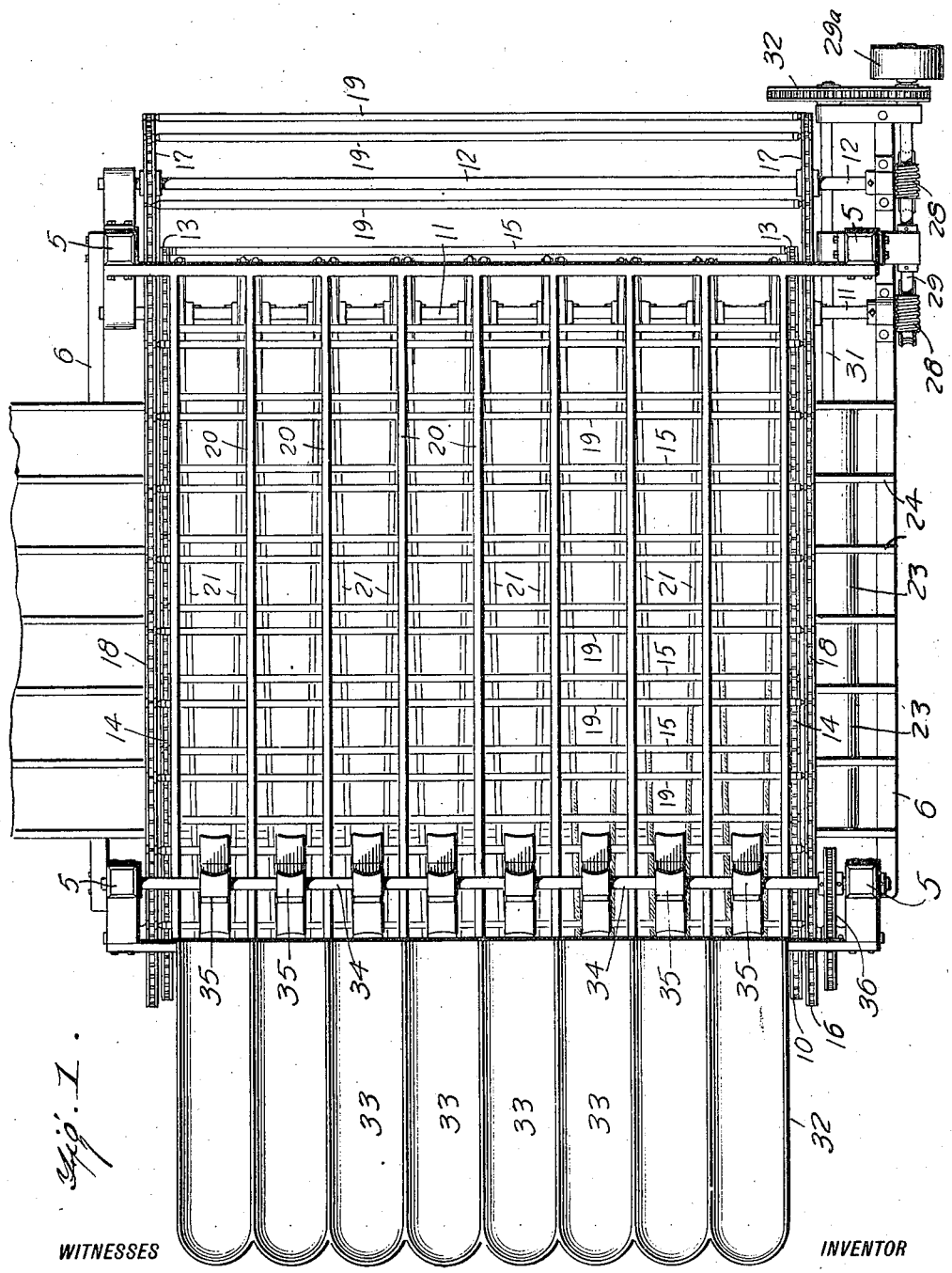
WITNESSES
INVENTOR
HERBERT G. PEARSON,
BY
ATTORNEYS

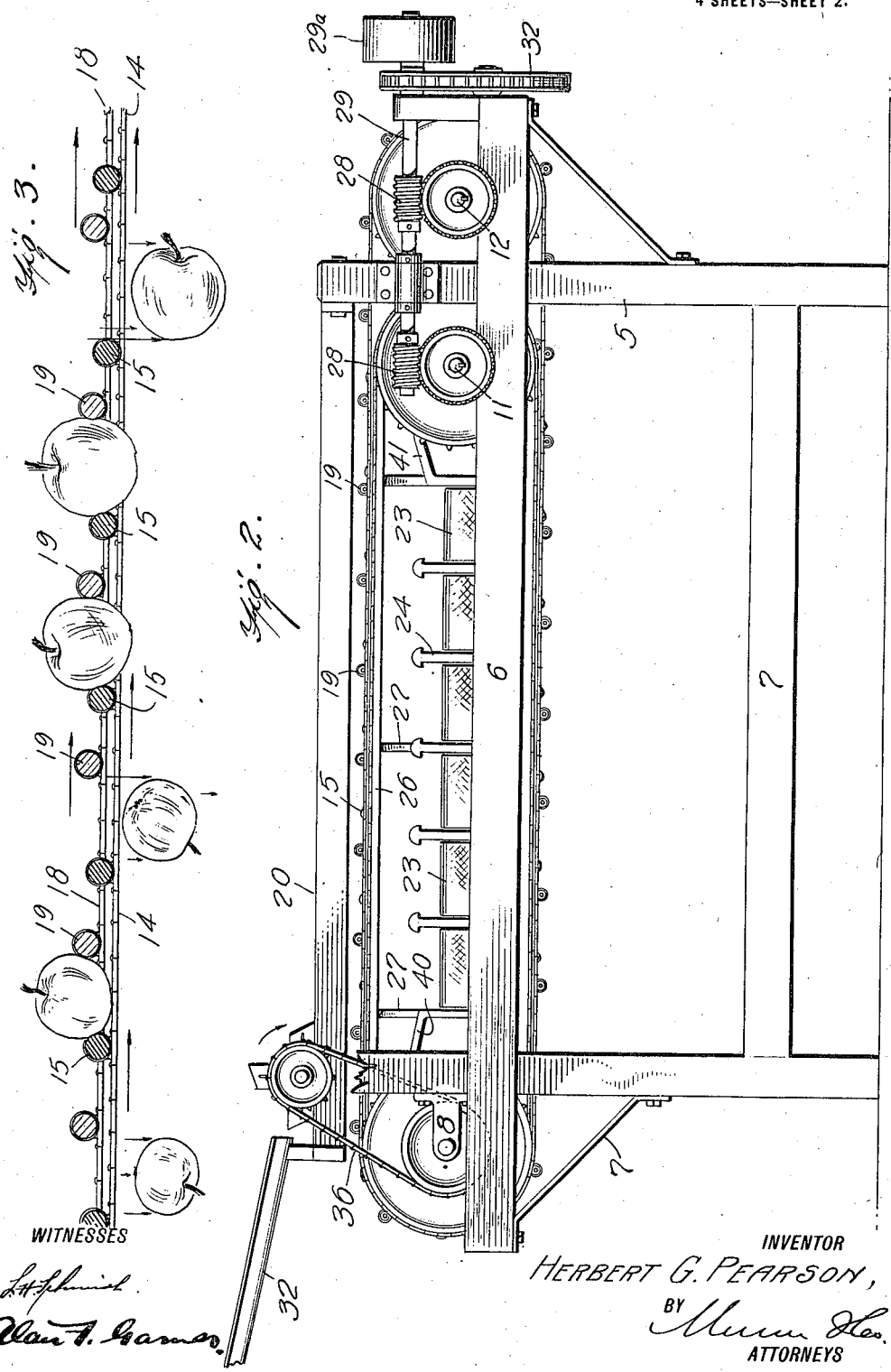

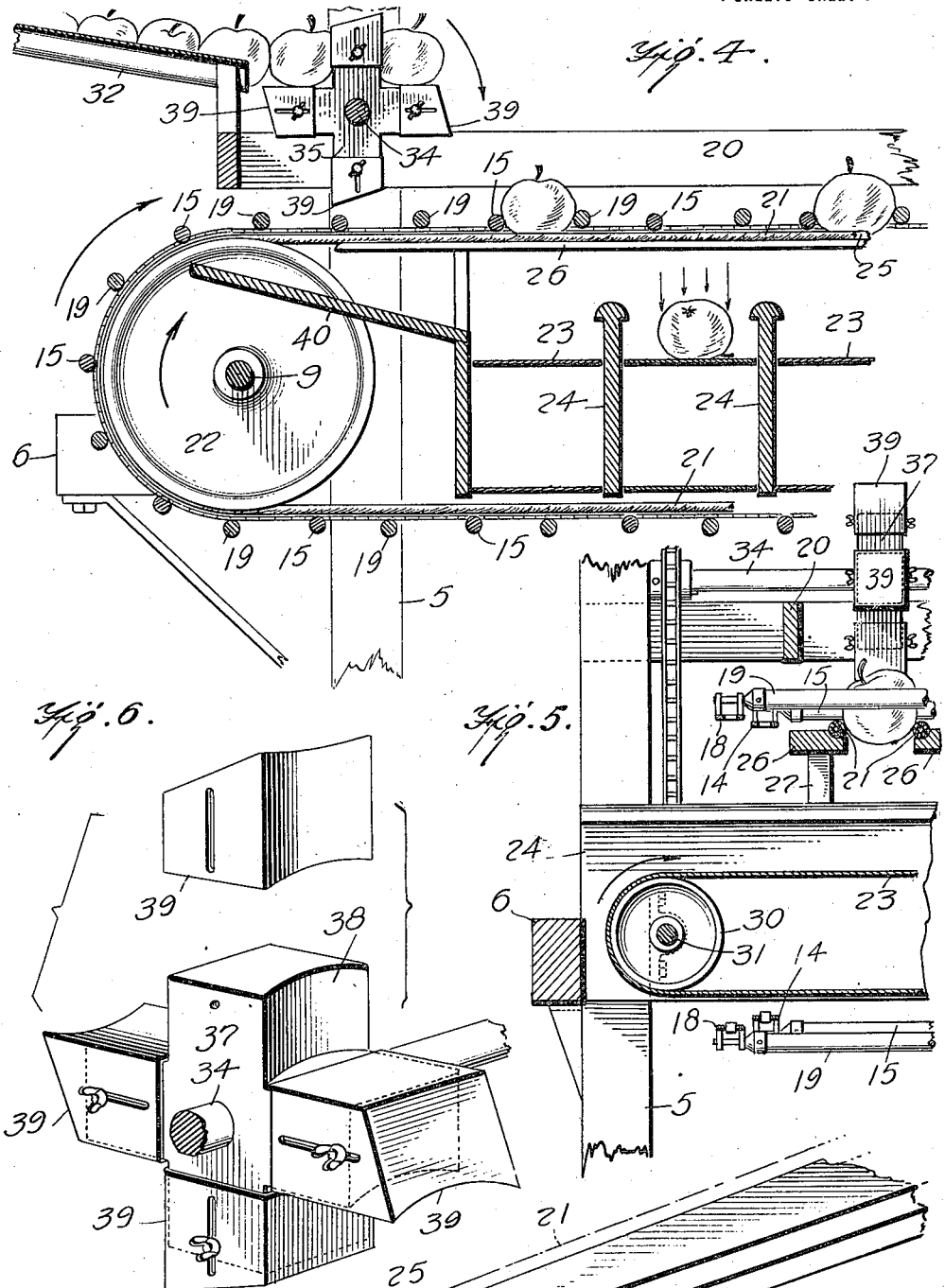

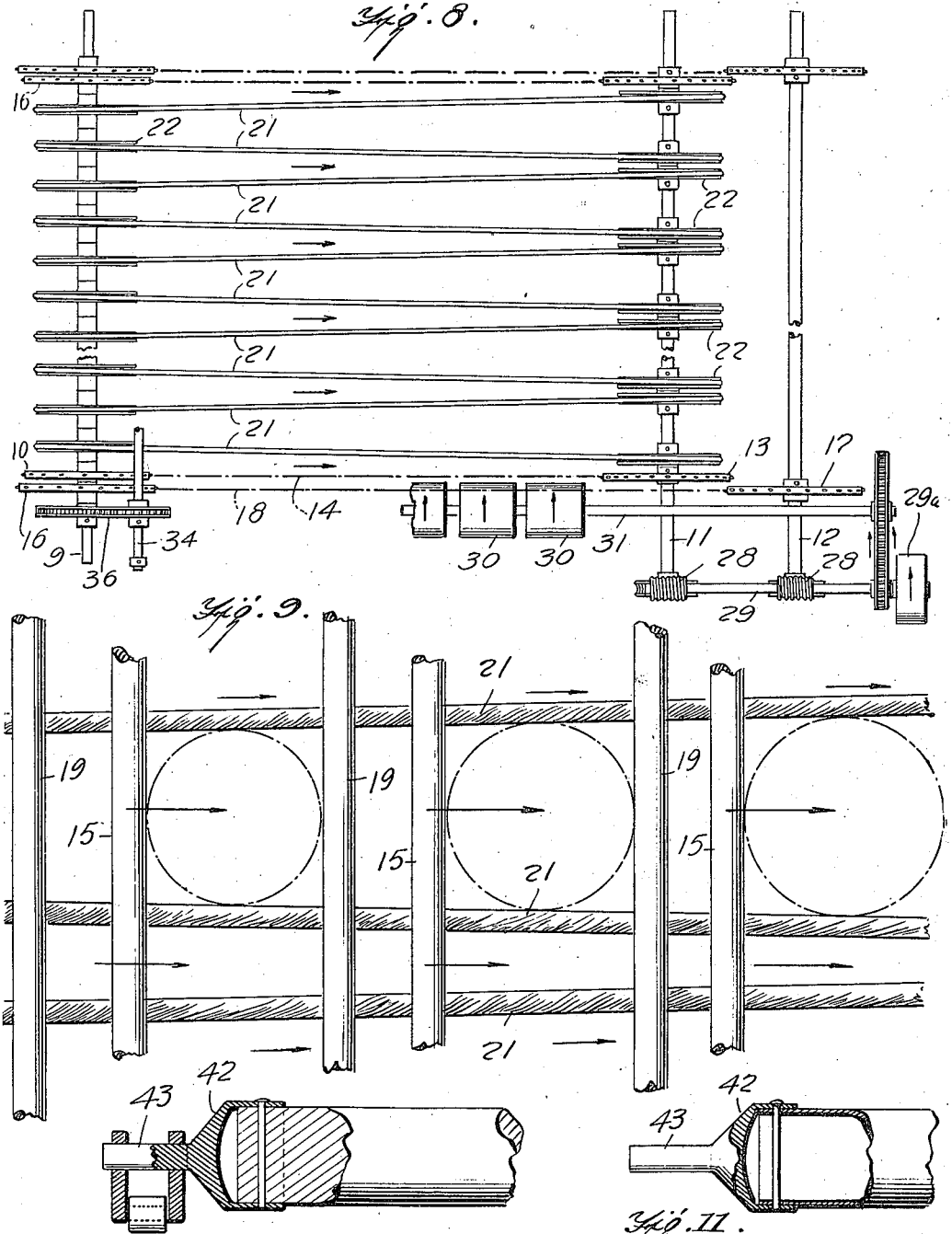

UNITED STATES PATENT OFFICE.

HERBERT GUY PEARSON, OF PAONIA, COLORADO.

FRUIT-SIZING MACHINE.

1,242,034.

Specification of Letters Patent.

Patented Oct. 2, 1917.

Application filed March 20, 1917. Serial No. 156,014.

*To all whom it may concern:*

Be it known that I, HERBERT G. PEARSON, a citizen of the United States, and a resident of Paonia, in the county of Delta and State of Colorado, have invented a certain new and useful Improvement in Fruit-Sizing Machines, of which the following is a specification.

The principal object of my invention is to provide an improved machine for sizing and assorting fruit with great precision and accuracy, by means of an arrangement of traveling bars and cables, on which the fruit is deposited, and which act to define openings of various predetermined sizes at various points in the movement of the apparatus, through which openings the fruit of corresponding sizes drop onto conveyers arranged for reception of the fruit, the operation of the device being such that the fruit of one predetermined size will be deposited on any one conveyer.

Another object of the invention is to provide an improved means of feeding the fruit to the sizing machine.

A still further object is to provide an improved sizing machine of the class described, which will be characterized by advantages of simplicity, durability, efficiency in operation, and economy in manufacture and maintenance.

With these and other objects in view which will become apparent as the description proceeds, the invention resides in the construction, combination, and arrangement of parts hereinafter more fully described and claimed, and illustrated in the accompanying drawings in which like characters of reference indicate like parts throughout the several figures, of which—

Figure 1 represents a top plan view of a fruit sizing machine constructed according to my invention;

Fig. 2 represents a side elevational view thereof;

Fig. 3 represents a fragmentary view in section taken longitudinally through the upper flights of moving bars;

Fig. 4 represents a fragmentary sectional view taken longitudinally of the machine at the end on which the fruit is fed to the sizing apparatus;

Fig. 5 represents a fragmentary transverse sectional view taken at right angles to Fig. 4;

Fig. 6 represents a view in perspective of one of the feeder wheels;

Fig. 7 represents a fragmentary perspective view of one of the cable supports and guides;

Fig. 8 represents a top plan view of the cable arrangement and the means for driving the cable and moving bars;

Fig. 9 represents a fragmentary enlarged top plan view of the sizing mechanism;

Fig. 10 represents a fragmentary view of one of the bars showing the same partially in section, to illustrate the method of attaching the bars to the driving chains;

Fig. 11 represents a fragmentary elevational view partially in section of another type of bar.

In carrying out my invention, I provide a framework, preferably rectangular in shape, including corner uprights 5, lateral bars 6, and suitable braces 7. Journaled at what may be termed the rear end of the machine, in suitable brackets 8, is a transversely extending shaft 9, on which a pair of smaller spaced sprocket wheels 10 (see Fig. 8) are fixed. Adjacent the opposite end of the machine is journaled a transverse shaft 11, and beyond this shaft is journaled a third shaft 12. A pair of sprocket wheels 13, of a size corresponding to the size of the sprockets 10, is fixed for rotation on shaft 11, and these sprocket wheels 13 are arranged in alinement with the sprocket 10. Over the alined pairs of sprockets 10 and 13, run the two endless drive belts or chains 14, which carry the spaced posterior bars 15. These bars are carried on the chains at equally spaced intervals apart, extend transversely of the machine in parallel relation to each other, and form the posterior walls or limits of the openings or squares through which the fruit is dropped in being sized.

On the shaft 9 at the rear end of the machine, and outside of the smaller sprockets 10, are journaled a pair of larger sprockets 16, which are adapted to rotate on the shaft 9 relatively to the sprockets 10. The shaft 12 carries the sprockets 17 which are alined with sprockets 16, and are of the same size as the sprockets 16. The alined pairs of sprockets 16 and 17 carry the endless chains 18, on which the transversely extending parallel anterior bars 19 are mounted. The bars 19 are spaced at equal intervals from each other, and the space between any adjacent pair of bars 19 is slightly greater than the space between any pair of bars 15. The size of the sprocket wheels 16 and 17 being slightly greater than that of the sprockets 10 and 13, it will follow, it being understood that the shafts 11 and 12 are driven at the same rate of speed, that the anterior bars 19 will move at a slightly greater rate of speed than the posterior bars 15, and consequently the distance between the anterior bars 19 and their corresponding posterior bars 15 will gradually increase as these bars move from the rear toward the forward end of the machine.

It may here be stated that the fruit, which is deposited on the sizing apparatus, by means to be hereinafter described, is guided as it moves forwardly with the apparatus, between parallel spaced rails 20 forming part of a framework which is arranged above the sizing apparatus. Below the upper flights of the traveling bars, and arranged within the confines of the path defined by the guide rails 20, are the pairs of traveling cables 21. These cables are arranged substantially at right angles with the bars 15 and 19, and travel from the rear to the front end of the machine. The pairs of cables 21, which cables are in the form of endless bands, run over sheaves 22 mounted in suitable positions for rotation with the shafts 9 and 11, as clearly shown in Fig. 8. From the rear toward the front end of the machine, the members of each pair 21 of cables diverge in the same ratio as the space increases between the anterior and posterior transverse bars, and the cables form the lateral limits or sides of the openings through which the fruit falls in being sized. This arrangement provides openings through the sizing apparatus which are substantially square in configuration, and these openings increase gradually in size in all dimensions, as the sizing apparatus travels forwardly, and at predetermined points along the line of travel of the apparatus the openings defined are of predetermined size. At these points are arranged the transversely extending conveyer belt 23, upon which the fruit is deposited as it drops through the openings defined in the sizing apparatus.

Thus fruit of a particular size will fall on each of the conveyer belts, and will be carried thereby to separate tables, not shown, for assorting as to color and blemish. It is thus understood that the expanding squares formed by the sizing apparatus receive one piece of fruit at a time and carry it forward until the square formed by the bars and cables is sufficiently large to allow the fruit to fall through onto the conveyer.

Between the conveyer belts 23 are arranged the partitions 24, which form runways for guiding the fruit onto the assorting tables. The adjacent members of each pair 21 of cables are guided in grooves 25 formed in the upper lateral edges of tapered guide plates 26, as clearly shown in Figs. 5 and 7 of the drawings. By this means the cables are supported between the sheaves 22 and are prevented from sagging under the weight of the fruit. The guide plates 26 are supported by means of suitable standards 27 secured to certain of the partitions 24.

The shafts 11 and 12 at the forward end of the machine, are driven at a common rate of speed, by means of a worm and gear transmission indicated at 28, from a jack shaft 29 driven by any suitable source of power by means of a belt and pulley, or other convenient transmission mechanism. The conveyers 23 at one end run over pulleys 30 carried by a shaft 31 arranged longitudinally of the machine. This shaft is driven by an endless chain 32, or by other suitable transmission means from the jack shaft 29.

At the rear end of the machine is arranged an inclined table 32 having corrugations 33 therein, which aline each with one of the guideways formed by the rails 20. On this table the fruit is to be placed for feeding onto the sizing apparatus. At the forward edge of the table is arranged a transverse shaft 34, journaled in the adjacent upright 5 of the framework, or otherwise suitably supported for rotation, and on this shaft are arranged the feed wheels indicated generally at 35, which wheels operate to move the fruit a piece at a time from the table onto the sizing apparatus. The shaft 34 is driven by a suitable transmission means, as for instance, a chain and sprocket, indicated at 36, from the shaft 9 at the rear end of the machine. As shown clearly in Fig. 4, the feed wheels act to deposit the pieces of fruit upon the sizing apparatus at a point approximately coinciding with the first conveyer belt 23. Each of the feed wheels includes the radially extending arms 37 arranged quadrantially about the axis of the wheels, which arms on their upper surfaces, that is those surfaces which receive the fruit from the table, are concaved as at 38. Each of the arms is fitted with an adjustable extension 39 whereby the length of the arms may be varied for adapting the feed wheels to fruits of various sizes.

In operation, the fruit deposited upon the table slides down the corrugated portion and is fed piece at a time onto the sizing apparatus. The inclined boards 40 and 41 arranged respectively at the rear and front ends of the machine adjacent the end conveyer belt, serve to direct extremely small and large sizes respectively, of fruit which may pass through the sizing apparatus either before the conveyer belts have been reached or after they have been passed onto the end conveyer belts, to be carried to the assorting table.

The bars 15 and 19 may be made of some soft wood, such as pine, or may be formed of tubular metal, as indicated in Fig. 11, and each bar is equipped at its end with a cap 42 on which a trunnion 43 is formed. Certain of the links of chains 14 and 18 are provided with upstanding ears, through openings in which the trunnions 43 are passed, as clearly shown in Fig. 10.

It is apparent from the construction set forth, that the anterior bars 19 move at a slightly greater rate of speed than the posterior bars 15, and thus gradually overhaul the posterior bars in front. At some point in the revolution of the chains carrying the anterior bars, these bars will have to pass the posterior bars immediately in front of them. The arrangement is such that this passing takes place while the anterior bars are moving around the sprockets 17, so that when the anterior and posterior bars again come into substantially coplaner relation on the under flights, the anterior bars will have passed the posterior bars that were immediately in front of them. This arrangement allows of the anterior and posterior bars being arranged in substantially coplaner relation, as indicated in Fig. 3, for more effectively supporting the pieces of fruit. The parts are so proportioned that the sizes of the openings defined by the sizing apparatus above the conveyer belts, remain constant.

One of the distinct and advantageous features of my invention resides in its precision in sizing the fruit, and in the fact that the fruit is handled without rolling or otherwise bruising it. The percentage of loss or waste caused by bruising the fruit, will therefore be reduced to a minimum.

Although I have described the preferred embodiment of my invention, I may desire to make such changes in the construction, combination, and arrangement of parts thereof, as do not depart from the spirit of the invention and the scope of the appended claims.

I claim:

1. A fruit sizing apparatus comprising traveling bands, each of which includes spaced parallel bars, means for driving the bands in such manner that one of them will move at a greater rate of speed than the other, so that the bars of one band will continuously move relatively to the bars of the other band, and means coöperating with the said traveling bars for defining openings of predetermined sizes at predetermined points along the course of travel of the bars.

2. A sizing apparatus comprising a pair of bands moving at different rates of speeds, said bands each including spaced parallel bars, the bars of both bands lying in parallel relation one to another, and means coöperating with the bars for defining openings of predetermined sizes at predetermined points along the course of travel of the bands.

3. A fruit sizing apparatus including traveling bands, moving one at a greater rate of speed than the other, spaced parallel bars forming a part of each band, and pairs of traveling cables arranged adjacent to the bars and substantially at right angles thereto for coöperating with the bars, in forming openings of predetermined sizes at predetermined points in the travel of the bands.

4. A fruit sizing apparatus including a series of equally spaced parallel moving bars, a second series of equally spaced parallel moving bars, said second series of bars moving at a different rate of speed from the first series, and pairs of divergent traveling cables arranged adjacent to the traveling bars and substantially at right angles thereto, for coöperating with the traveling bars, in forming openings of predetermined sizes at predetermined points in the path of travel of the bars.

5. A fruit sizing apparatus including a series of equally spaced parallel traveling bars, a second series of equally spaced parallel traveling bars moving at a different rate of speed than the first series, the bars of one series being spaced apart a distance unequal to the distance at which the other series of bars are spaced, and means coöperating with the bars in forming openings of predetermined sizes at predetermined points in the travel of the bars.

6. A fruit sizing apparatus including two traveling bands of spaced parallel bars, one of which moves at a greater rate of speed than the other, and means forming with the bands openings of predetermined sizes at predetermined points in the travel of the bands.

7. A fruit sizer including a sizing apparatus consisting of series of traveling spaced bars, traveling spaced cables coöperating with the bars, in forming openings for sizing the fruit, and means for guiding and supporting the cables.

8. A fruit sizer including pairs of divergent traveling cables, and a plurality of series of traveling bars arranged above and substantially at right angles with the cables, and coacting therewith in forming openings of predetermined sizes at predetermined points throughout the length of the cables.

9. In a sizing apparatus, the combination with pairs of divergent traveling cables, of means moving at different speeds and forming with the cables openings of predetermined sizes at predetermined points in the path of travel of the cable, through which articles to be sized may be dropped.

10. In a sizing apparatus, the combination of traveling belts, of spaced parallel bars moving in a common direction and at various speeds, and cables arranged substantially at right angles to the bars, and moving in a common direction therewith.

HERBERT GUY PEARSON.

Witnesses:
 ALBERT J. CADY,
 M. H. CRISSMAN.